2,792,403
Patented May 14, 1957

2,792,403

2-PYRIDYLETHYL-PHENYLETHYLALKYLAMINES

Frederick F. Blicke, Ann Arbor, Mich., assignor to Regents of The University of Michigan, Ann Arbor, Mich., a corporation of Michigan No Drawing. Application January 5, 1955, Serial No. 480,063

6 Claims. (Cl. 260—296)

This invention relates to 2-{2-[N-(monocarbocyclic aryl-lower-alkyl)-N-(lower-alkyl)amino]ethyl}pyridines in which the aryl group and the acyclic nitrogen atom are attached to adjacent carbon atoms, and to acid-addition salts thereof.

The compounds of the invention have the general formula

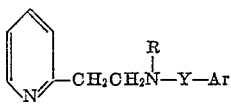

wherein R is a lower-alkyl group, Y is a lower-alkylene radical in which the free valences are on adjacent carbon atoms, and Ar is a monocarbocyclic aryl group.

Pharmacological evaluation of the compounds of the invention by measuring their effect upon the carotid arterial pressure in dogs made hypertensive with 1-epinephrine shows that the compounds possess adrenolytic activity and indicates their usefulness as blood-pressure lowering agents.

In the above general formula the group R represents a lower-alkyl group. The lower-alkyl group may be straight or branched and contains from one to about six carbon atoms, thus including such groups as methyl, ethyl, propyl, isopropyl, butyl, tertiary-butyl, isobutyl, pentyl, isopentyl, hexyl, isohexyl, and the like.

In the above general formula the radical Y represents a lower-alkylene radical in which the free valences are on adjacent carbon atoms. In other words, Y is an ethylene radical or an ethylene radical substituted by lower-alkyl groups, thus including such groups as ethylene, —CH₂CH₂—, 1-methylethylene, —CHCH(CH₃), 1,1-dimethylethylene, —CHC(CH₃)₂—, 1,2-dimethylethylene, —CH(CH₃)CH(CH₃)—, 1-ethylethylene,

—CH₂CH(C₂H₅)₂—

1-isopropylethylene, —CH₂CH[CH(CH₃)₂]—, and the like. The radical Y preferably contains from 2 to about 6 carbon atoms.

In the above general formula the group Ar represents a monocarbocyclic aryl group, and therefore is a radical of the benzene series and can be an unsubstituted phenyl group or a phenyl group substituted by one or more substituents inert to the reaction conditions and reagents used in the process for preparing the compounds. Such inert substituents include lower-alkyl, lower-alkoxy, halogen, nitro, dialkylamino and trifluoromethyl groups. However, groups susceptible to reaction with vinylpyridines, such as primary or secondary amino, hydroxy or mercapto, are not suitable as substituents in Ar. A preferred class of monocarbocyclic aryl groups consists of phenyl and phenyl substituted by from one to three lower-alkyl, lower-alkoxy, halogen or nitro groups, and if two or more substituents are present they can be the same or different and in any of the various positions relative to one another. The lower-alkyl and lower-alkoxy groups preferably have from one to about four carbon atoms and thus include methyl, ethyl, propyl, isopropyl, butyl, isobutyl, methoxy, ethoxy, propoxy, isopropoxy, butoxy, isobutoxy, and the like. The term lower-alkoxy is also intended to include the methylenedioxy group,

—OCH₂O— which, although divalent, can be readily classed with the monovalent alkoxy groups on the basis of its chemical properties. The halogen substituents can be any of the four halogens, fluorine, chlorine, bromine or iodine. Specific examples of the group Ar include phenyl, p-tolyl, p-ethylphenyl, m-butylphenyl, 3,4-methylenedioxyphenyl, o-ethoxyphenyl, m-propoxyphenyl, p-butoxyphenyl, 3,4-dimethoxyphenyl, 2-methyl-4-methoxyphenyl, p-nitrophenyl, o-chlorophenyl, p-bromophenyl, 3,4-dichlorophenyl, and the like.

The compounds of the invention are most conveniently prepared and used in the form of crystalline, water-soluble acid-addition salts, the anions of which are non-toxic to animal organisms in therapeutic doses of the salts, and these salts are also within the purview of the invention. Appropriate acid-addition salts are those derived from mineral acids such as hydrochloric acid, hydrobromic acid, hydriodic acid, nitric acid, phosphoric acid, and sulfuric acid, and organic acids such as acetic acid, citric acid, tartaric acid, lactic acid, and the like, giving the hydrochloride, hydrobromide, hydriodide, nitrate, phosphate or acid phosphate, sulfate or bisulfate acetate, citrate or acid citrate, tartrate or bitartrate, and lactate salts, respectively. The compounds of the invention contain two basic nitrogen atoms, and therefore both mono- and di-acid-addition salts can be obtained, depending upon the relative amount of acid and base used and the conditions of the salt formation. A di-acid-addition salt will generally be obtained if an excess of acid is employed.

The compounds of the invention are prepared by heating 2-vinylpyridine with a N-(monocarbocyclic aryl-lower-alkyl)-N-(lower-alkyl)amine, R—NH—Y—Ar. The conditions of the reaction are not critical; the heating may take place at a temperature between about 50° C. and 250° C., although it is convenient to use the refluxing temperature of the mixture to provide adequate mixing. An inert solvent can be used if desired, but it is not essential. The preparation of the compounds of the invention is illustrated as follows:

A mixture of 9.2 parts of N-(2-phenylethyl)-N-methylamine and 10.5 parts of 2-vinylpyridine was refluxed for about five hours. The excess 2-vinylpyridine was then removed by distillation, and the residue was fractionated in vacuo giving 2-{2-[N-(2-phenylethyl)-N-methylamino]ethyl}pyridine (R=CH₃, Y=CH₂CH₂, Ar=C₆H₅), B. P. 197–200° C. (15 mm.). Treatment of the free base with an ethereal or alcoholic solution of hydrogen chloride gave 2-{2-[N-(2-phenylethyl)-N-methylamino]ethyl}pyridine in the form of its dihydrochloride salt, having the M. P. 157–158° C. when recrystallized from an ethanol-ether mixture.

Analysis.—Calc. for C₁₆H₂₂N₂Cl₂: N, 8.94; Cl, 22.63. Found: N, 8.88; Cl, 22.60.

2-{2-[N-(-phenylethyl)-N-methylamino]ethyl}pyridine in the form of its dihydrochloride salt was found to have adrenolytic activity in dogs as evidenced by the fact that at dose levels of 5 mg./kg. and higher the compound reversed the hypertension produced by a 2γ/kg. dose of 1-epinephrine, as determined by measuring carotid arterial pressure in anesthetized dogs.

According to the manipulative procedure described above, 2-{2-[N-(2-phenyethyl)-N-isopropylamino]ethyl}pyridine (R=CH(CH₃)₂, Y=CH₂CH₂, Ar=C₆H₅), 2 - {2 - [N-(2-phenylethyl)-N-butylamino]ethyl}pyridine (R=C₄H₉, Y=CH₂CH₂, Ar=C₆H₅), and 2-[2-{N-[2-(p-methoxyphenyl)ethyl]-N-methylamino}ethyl]pyridine (R=CH₃, Y=CCH₂CH₂, Ar=p—CH₃OC₆H₄) can be prepared by heating 2-vinylpyridine with N-(2-phenylethyl) - N - isopropylamine, N-(2-phenylethyl)-N-butylamine, and N-[2-(p-methoxyphenyl)ethyl]-N-methylamine, respectively.

According to the manipulative procedure described above, 2 - [2-{N - [2 - (p - fluorophenyl)ethyl]-N-methylamino}ethyl]-pyridine (R=CH₃, Y=CH₂CH₂, Ar=p—FC₆H₄)

2-[2-{N-[2-(3-chloro-4-methoxyphenyl)ethyl]-N-methylamino}ethyl]pyridine (R=CH₃, Y=CH₂CH₂, Ar=3,4—Cl(CH₃O)C₆H₃)

and 2 - [2 - {N-[2-(3,4-diethoxyphenyl)ethyl]-N-methylamino}ethyl]pyridine (R=CH₃, Y=CH₂CH₂, Ar=3,4—(C₂H₅O)₂C₆H₃)

can be prepared by heating 2-vinylpyridine with N-[2-(p-fluorophenyl)ethyl]-N-methylamine, N-[2-(3-chloro-4-methoxyphenyl)ethyl]-N-methylamine, and N-[2-(3,4-diethoxyphenyl)ethyl]-N-methylamine, respectively.

According to the manipulative procedure described above, 2-[2-{N-[2-(p-ethylphenyl)ethyl]-N-methylamino}ethyl]-pyridine (R=CH₃, Y=CH₂CH₂, Ar=p—C₂H₅C₆H₄)

2 - {2 - [N-(2-phenylethyl)-N-hexylamino]ethyl}pyridine (R=C₆H₁₃, Y=CH₂CH₂, Ar=C₆H₅), and 2-[2-{N-[2-(3,4 - methylenedioxyphenyl)ethyl]-N-methylamino}-ethyl]pyridine (R=CH₃, Y=CH₂CH₂, Ar=3,4—CH₂O₂C₆H₃) can be prepared by heating 2-vinylpyridine with N-[2-(p-ethylphenyl)-ethyl]-N-methylamine, N-(2-phenylethyl)-N-hexylamine, and N-[2-(3,4-methylenedioxy)ethyl]-N-methylamine, respectively.

According to the manipulative procedure described above, 2 - {2 - [N - (2 - phenyl-1-methylethyl)-N-methylamino]ethyl} - pyridine (R=CH₃, Y=CH₂CH(CH₃), Ar=C₆H₅), 2 - {2 - [N - (2 - phenyl-1-isopropyethyl)-N-methylamino]ethyl}pyridine (R=CH₃, Y=CH₂CH[CH(CH₃)₂], Ar=C₆H₅)

and 2-{2-[N-(2-phenyl-1,1-dimethylethyl)-N-methylamino]ethyl}pyridine (R=CH₃, Y=CH₂C(CH₃)₂, Ar=C₆H₅) can be prepared by heating 2-vinylpyridine with N-(2-phenyl - 1 - methylethyl)-N-methylamine, N-(2-phenyl-1-isopropylethyl)-N-methylamine, and N-(2-phenyl-1,1-dimethylethyl)-N-methylamine, respectively.

According to the manipulative procedure described above, 2 - [2 - {N - [2-(3,4-methylenedioxyphenyl)-1,1-dimethylethyl]-N-methylamino}ethyl]pyridine (R=CH₃, Y=CH₂C(CH₃)₂, Ar=3,4—CH₂O₂C₆H₃)

and 2 - [2-{N-[2-(3,4-dimethoxyphenyl)-1-methylethyl]-N-methylamino}ethyl]pyridine (R=CH₃, Y=CH₂CH(CH₃), Ar=3,4—(CH₃O)₂C₆H₃)

can be prepared by heating 2-vinylpyridine with N-[2-(3,4 - methylenedioxyphenyl) - 1,1 - dimethylethyl] - N-methylamine, and N-[2-(3,4-dimethoxyphenyl)-1-methylethyl]-N-methylamine, respectively.

I claim:

1. A compound selected from the class consisting of 2-{2-[N-(monocarbocyclic aryl-lower-alkyl)-N-(lower-alkyl)amino]-ethyl}pyridines in which the aryl group and the acyclic nitrogen atom are attached to adjacent carbon atoms, and the monocarbocyclic aryl group is selected from the group consisting of phenyl and phenyl substituted by from one to three substituents selected from the group consisting of lower-alkyl, lower-alkoxy, nitro and halogen groups; and acid-addition salts thereof, the anions of which do not substantially increase the toxicity of the compounds as a whole toward animal organisms.

2. A 2-{2-[N-(phenyl-lower-alkyl)-N-(lower-alkyl)amino]-ethyl}pyridine in which the aryl group and the acyclic nitrogen atom are attached to adjacent carbon atoms.

3. A 2-{2-[N-(2-phenylethyl)-N-(lower-alkyl)amino]-ethyl}pyridine.

4. 2 - {2 - [N-(2 - phenylethyl)-N-methylamino]ethyl}pyridine.

5. An acid-addition salt, the anions of which do not substantially increase the toxicity of the compounds as a whole toward animal organisms, of 2-{2-[N-(2-phenylethyl)-N-methylamino]ethyl}pyridine.

6. 2 - {2 - [N-(2-phenylethyl)-N-methylamino]ethyl}-pyridine dihydrochloride.

No references cited.